US006526875B1

(12) United States Patent
Dzbinski

(10) Patent No.: US 6,526,875 B1
(45) Date of Patent: Mar. 4, 2003

(54) COOKING VESSEL WITH REMOVABLE TROUGH

(75) Inventor: DuWayne M. Dzbinski, Holmes Bach, FL (US)

(73) Assignee: DuWayne Dzibinski, Holmes Beach, FL (US)

( * ) Notice: Subject to any disclaimer, the term of this patent is extended or adjusted under 35 U.S.C. 154(b) by 79 days.

(21) Appl. No.: 09/939,953

(22) Filed: Aug. 27, 2001

(51) Int. Cl.[7] ............................. A47J 27/00; A47J 37/10
(52) U.S. Cl. ............................. 99/339; 99/403; 99/422; 99/425; 99/446; 99/448; 99/450; 126/373.1; 126/369
(58) Field of Search ..................... 99/330, 339, 340, 99/357, 400, 401, 422–425, 403, 410, 413, 417, 418, 444–450; 126/373.1, 369, 369.1, 369.2; 220/912, 753, 4.01; 219/401; 426/523, 510, 511; D7/354, 357, 360

(56) References Cited

U.S. PATENT DOCUMENTS

| | | | |
|---|---|---|---|
| 2,622,591 A | | 12/1952 | Bramberry |
| D173,387 S | | 11/1954 | Schnitzer |
| 3,439,603 A | | 4/1969 | Reames |
| 3,797,693 A | * | 3/1974 | Baker ...................... 220/912 X |
| 3,808,963 A | | 5/1974 | Ludena |
| 3,831,002 A | * | 8/1974 | Mysicka et al. .......... 99/425 X |
| 4,000,830 A | * | 1/1977 | French .................... 220/912 X |
| 4,045,606 A | * | 8/1977 | Kalkowski ................ 99/446 X |
| 4,091,956 A | * | 5/1978 | Vecchio .................... 126/25 R |
| 4,258,694 A | * | 3/1981 | Kato ........................ 99/339 X |
| 4,298,135 A | * | 11/1981 | Vossen ................... 220/912 X |
| 4,320,699 A | * | 3/1982 | Binks ....................... 99/422 X |
| 4,418,829 A | | 12/1983 | Clay |
| 4,482,077 A | * | 11/1984 | Henderson ................ 99/339 X |
| 4,491,235 A | | 1/1985 | Fournier et al. |
| 4,528,975 A | | 7/1985 | Wang |
| 4,636,618 A | * | 1/1987 | Jenicot ..................... 99/339 X |
| 4,666,727 A | | 5/1987 | Wang |
| 4,700,689 A | * | 10/1987 | Speker ....................... 126/9 R |
| 4,832,225 A | * | 5/1989 | Benjamin ................ 99/413 X |
| 4,873,921 A | | 10/1989 | Piane, Sr. |
| 5,129,314 A | | 7/1992 | Hu |
| 5,189,945 A | | 3/1993 | Hennick |
| 5,239,916 A | | 8/1993 | Hu |
| 5,241,900 A | | 9/1993 | Piane, Sr. |
| 5,345,062 A | | 9/1994 | Maudal |
| 5,365,833 A | | 11/1994 | Chen |
| 5,377,859 A | * | 1/1995 | Hacker ................... 220/912 X |
| 5,511,466 A | | 4/1996 | Dzbinski |
| D374,792 S | | 10/1996 | Dzbinski |

* cited by examiner

Primary Examiner—Timothy F. Simone

(57) ABSTRACT

The invention involves an improved cooking system of the type having a cooking vessel with watertight lower portion of a concave interior, having side walls generally upwardly extending from a bottom. The improvement is the addition of an annular, substantially hemi-toroidal insert. The insert is dimensioned to engage an inner surface of the side walls thereby removably supporting the insert within the cooking vessel remote from the bottom. There is a central opening in the middle of the insert, above the bottom of the vessel, whereby the bottom of the vessel may be accessed. In this way, utensils may be employed to manipulate the food cooking in the bottom of the pot or wok, ingredients may be added to the food cooking in the bottom of the pot or wok, water may be added to the bottom of the pot or wok, etc.

19 Claims, 7 Drawing Sheets

COOKING VESSEL WITH REMOVABLE TROUGH

FIELD OF THE INVENTION

The invention relates generally to cooking vessels and more particularly to inserts for cooking vessels.

BACKGROUND OF THE INVENTION

Cooking techniques are ancient and require little exposition here other than: heat, provided by a flame or other heating element, is directed to a vessel, most typically made of metal, whereby the heat transmitted from the heat source is conducted through the metal to the food. It is necessary that the item being cooked contain some moisture in order to avoid burning. Food items not containing sufficient moisture are generally boiled in water or placed in the vessel with another food item having a greater moisture content (e.g., sauces, pastes, soups, fats, etc.). Some of the disadvantages of cooking food in water are that the food items lose flavor to the water, vitamins contained within the food items leach out into the water and when subjected to lengthy cook times, vitamins contained within the food items are subject to thermal degradation, and spices placed in contact with food items are washed from desired placement. Alternatively, foods cooked with other foods blend their flavors, which may not be desired.

To avoid some of these problems, steam is sometimes utilized. The usual methods of cooking with steam are through use of a double-boiler or a steamer insert of bamboo or metal. Disadvantages exist in both types of these steam-utilizing inserts. In the case of a metal double boiler, the high-heat capacity of water is under-utilized because the steam interacts with the inner vessel only and not with the food. In the case of a bamboo steamer, convective currents of a closed system are not utilized.

Moreover, in both cases, the vessel adjacent to the heat source is used exclusively as a water reservoir/steam generator.

A first attempt at the creation of a coincident multi-task cooking vessel capable for use as a full-service steamer, was made by Dzibinski in U.S. Pat. No. 5,511,466. The '466 Patent discloses a wok-like cooking utensil which includes an integrated cooking trough about the upper perimeter of the cooking utensil. The '466 Patent has certain drawbacks. First, when the lid is removed, for instance to stir-fry items in the bottom of the cooking utensil, the heat within the cooking trough is rapidly lost and not replaced while the lid is off. Second, even with the lid on, the design does not make use of the heat that could be generated from below the cooking trough. Third, the cooking utensil of the '466 Patent is of unitary construction and does not allow for conversion to a conventional wok, nor does it allow for retrofitting of existing woks and pots. Fourth, the cooking trough will retain as liquid, any steam which has condensed on the lid thereby allowing the food items to sit in the condensation.

A removable cooking trough for use in a cooking vessel which would facilitate cooking several food items at the same time without co-mingling and while using the high-heat capacity of steam, would be an important improvement in the art.

OBJECTS OF THE INVENTION

It is an object of the invention to provide a cooking device that overcomes some of the shortcomings of the prior art.

Another object of the invention is to provide a cooking device that takes advantage of the constant temperature properties of steam to evenly cook food.

It is another object of the invention to take advantage of natural convection patterns within a covered wok to direct heat to an insert ring in a cooking device.

It is still another object of the invention to provide a cooking device that allows a person to cook two different food items in the same vessel without mixing the items within the vessel.

Another object of the invention is to cook food items within a vessel, exposing the food item to aromatic spicing sources without allowing physical contact between the food item and the spicing source.

It is yet another object of the invention to take advantage of pressurizing a cooking vessel to reduce the cooking time of food items.

Another object of the invention is to retrofit existing pots and woks with an insert that takes advantage of trough and covered-trough cooking.

Another object of the invention is to utilize steam for the cooking of items in one part of a vessel while allowing access with utensils to another part of the vessel where other items are being cooked at the same time.

How these and other objects are accomplished will become apparent from the following descriptions and from the drawings.

SUMMARY OF THE INVENTION

The invention involves an improved cooking system of the type having a cooking vessel with a watertight lower portion having a concave interior, and side walls extending generally upwardly from the bottom. The cooking vessel may have bottom which is flat, like a pot or rounded, like a traditional wok. The improvement is an annular, substantially hemi-toroidal insert. By "annular, . . . hemi-toroidal", the applicant is describing a shape which resembles a tube wrapped into a donut shape and then cut horizontally to create a ring-shaped trough. By the use of the adverb "substantially", the applicant is not limiting the cross-sectional shape to a semi-circle, but rather the trough can be of any cross-section, including the circle's antithesis, a square. The insert is dimensioned to engage the inner surface of the side walls or a lip near the top of the sidewall thereby removably supporting the insert within the cooking vessel remote from the bottom. The insert has a central opening (i.e., the "hole of the donut") above the bottom of the cooking vessel, whereby the bottom of the cooking vessel may be accessed. In this way, utensils may be employed to manipulate the food cooking in the bottom of the pot or wok, ingredients may be added to the food cooking in the bottom of the pot or wok, liquid may be added to the bottom of the pot or wok, etc.

In one embodiment of the invention, the cooking trough includes a plurality of apertures which allow steam to contact the food items in the cooking trough from below and further allow liquid accumulating in the cooking trough to escape to the bottom of the cooking vessel. This embodiment is further improved by an annular, substantially hemi-toroidal, cover which substantially encloses the cooking trough. The insert cover is made more advantageous when the insert cover is segmented. In this way, one segment may be displaced to view or to test the contents of the insert without opening the whole trough.

In another embodiment, the cooking vessel has side walls which terminate in a upwardly-extending circular rim having an inside diameter. The cooking vessel further includes a hollow dome-like lid having inner and outer surfaces terminating in a radially extending outer rim and is removably supported by the cooking vessel sidewalls. In another aspect of this embodiment, the outside diameter of the lid is less than the inside diameter of the vessel rim such that the dome-like lid is removably supported by the cooking vessel sidewalls in a position entirely enclosing the insert. In yet another aspect of this invention, the lid is releasably sealed to the sidewalls; in this way, the benefits of increased pressure may be utilized, for instance to decrease cooking time.

In another preferred embodiment, the insert is a truncated annulus having an arcuate range of at least 180° about a main axis of the annular, substantially hemi-toroidal insert. In another aspect of this embodiment, end walls located at the truncated ends of the insert substantially enclose at least the lower portion of the cooking trough, thereby preventing items placed in the insert from falling out of the ends. In yet another aspect of this embodiment, there is a truncated annular, substantially hemi-toroidal insert cover to substantially enclose the truncated cooking trough. It is yet more advantageous in this aspect for the truncated insert cover to be segmented.

In another embodiment of the invention, the cooking vessel has bowl-like side walls such that it has horizontal, circular cross-sections. Each of the circular cross-sections has a common side-wall axis. The insert has a main axis which is coaxial with the side-wall axis.

In another embodiment of the invention, a substantially perforated partition is removably secured with respect to the insert across the central opening thereof. It is desirable for the partition to be a horizontal, screen cooking surface. It is another desirable embodiment for the partition to be an upwardly opening, downwardly extending, concave mesh basket.

It is another aspect of this invention to provide a insert for vertical insertion into a cooking vessel having a bottom and side walls extending upwardly therefrom. The cooking vessel side walls have an upper portion having an interior surface of a specific shape. The insert has an annular trough member extending circumjacent along the inner surface of the side walls. The trough member has a generally convex lower surface with a sidewall-adjacent portion of the lower surface complementary in shape to the inner surface of the sidewalls. The trough member has an upwardly-opening, concave upper surface. There is also at least one support member secured with respect to the trough member and in engageable contact with the side walls whereby the trough member is removably supported within the cooking vessel by the side walls.

In a preferred embodiment, the insert includes at least one support member engageable with the interior of the cooking vessel such that the trough member is removably supported with respect to the cooking vessel in a position remote from the bottom of the cooking vessel. In a more preferred embodiment, the insert includes at least three support members, each support member attached with respect to the convex lower surface of the trough member and each support member engageable with the interior of the cooking vessel such that the trough member is removably supported with respect to the cooking vessel in a position remote from the bottom of the cooking vessel.

In yet another embodiment of the invention, the trough member is composed of spun aluminum.

BRIEF DESCRIPTION OF THE DRAWINGS

The drawings illustrate preferred embodiments which include the above-noted characteristics and features of the invention. The invention will be readily understood from the descriptions and drawings. In the drawings.

DETAILED DESCRIPTION OF PREFERRED EMBODIMENTS

Figure 1:
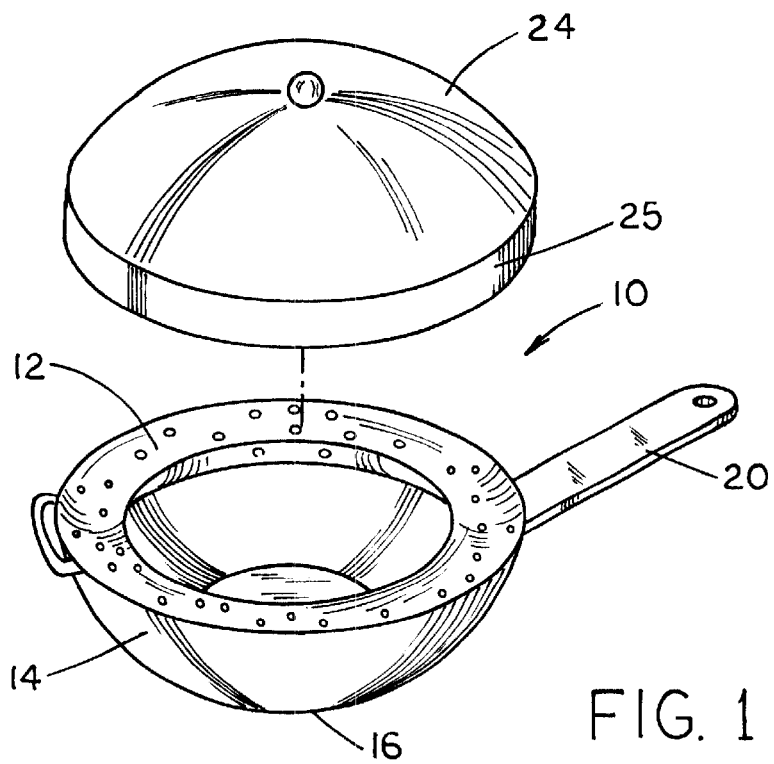
FIG. 1 is a partially-exploded perspective view of an insert according to this invention.
Figure 2:
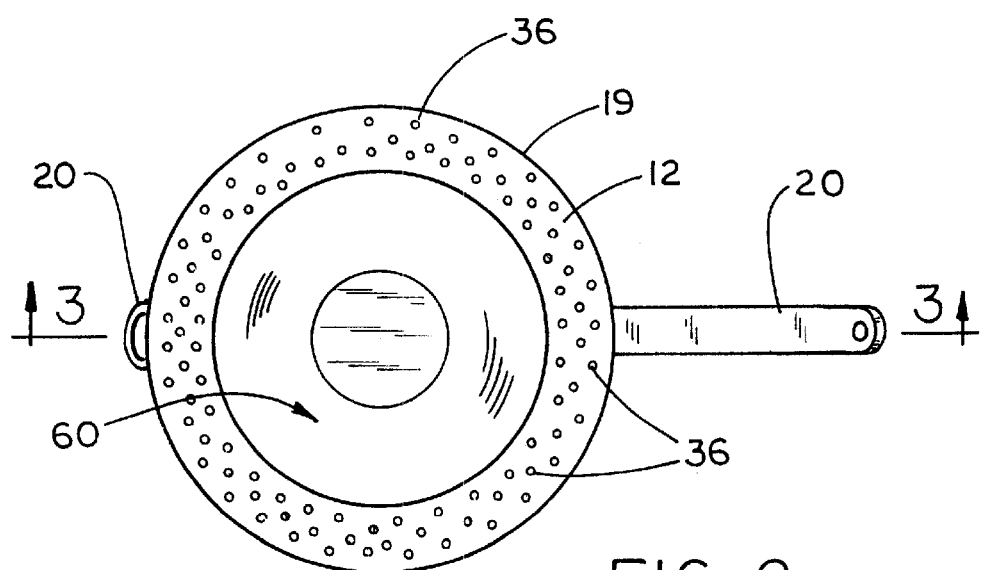
FIG. 2 is a top view of the invention installed within a cooking vessel.
Figure 9:
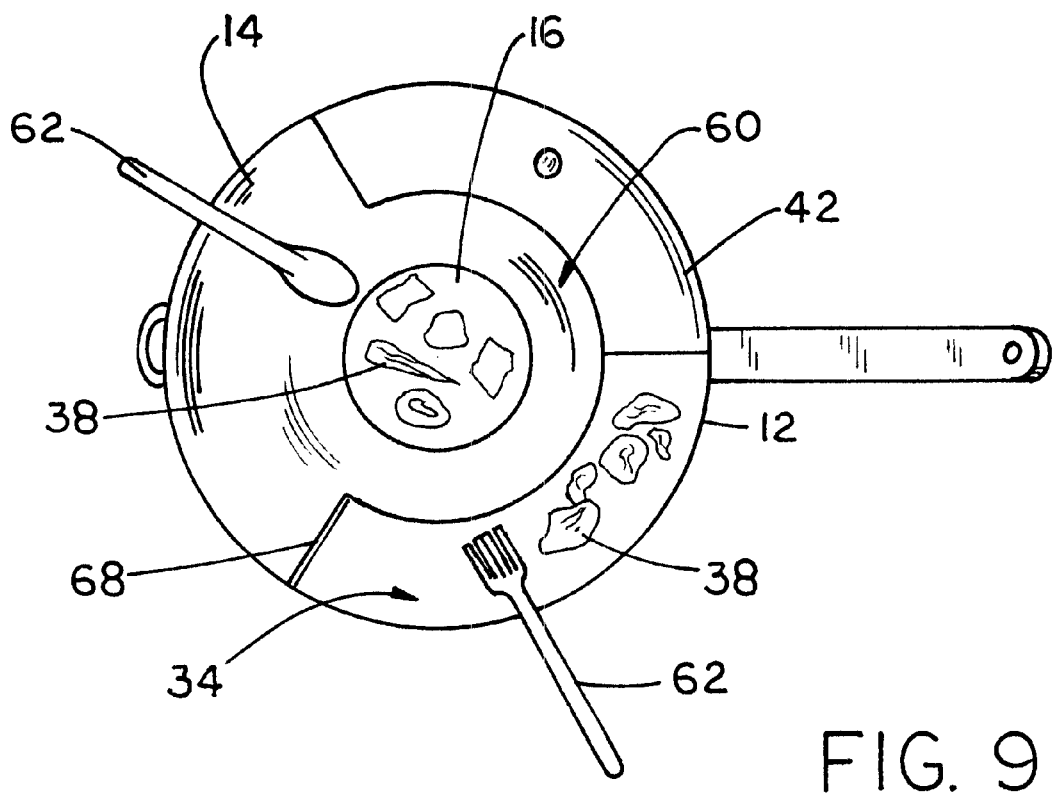
FIG. 9 is a top view of the cooking system showing an annular insert in which the insert does not extend along the entire perimeter of the cooking vessel and includes segmented insert covers with one of such covers removed.
Figure 11:
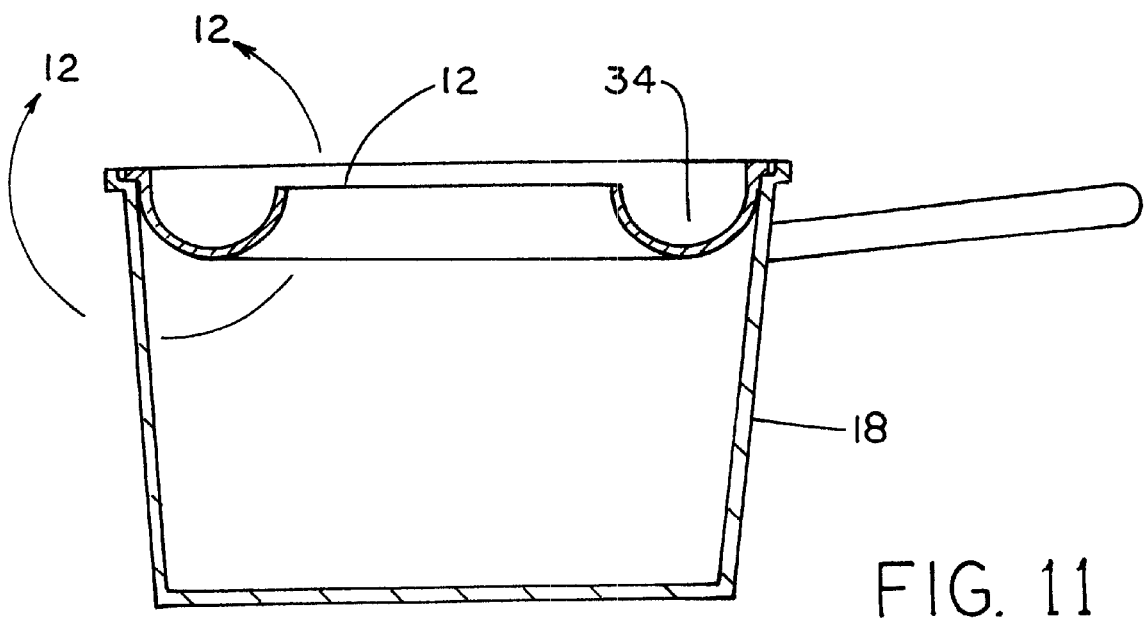
FIG. 11 is a cross-sectional view of an alternate embodiment of the invention in a cylindrical cooking vessel.

As can be seen in FIG. 1, a cooking system in accordance with the present invention is generally designated by the reference numeral 10. Cooking system 10 includes an insert 12 for placement in a cooking vessel 14. As depicted, cooking vessel 14 is a wok. As will be seen later, the invention is not limited to use in a wok. Cooking vessel 14 has a bottom 16 integral with side walls 18 which extend up to create a water-tight vessel. Bottom 16 may be convexly rounded as depicted in FIG. 1 or flat as depicted in FIGS. 3, 4, 6, and 11 without appreciable difference in the operation of the system. Similarly, side walls 18 may be curved as shown in FIGS. 1–4 or substantially vertical as shown in FIG. 11. As seen in FIGS. 2, 5, and 9, the circumference of cooking vessel 14 is typically circular, but the invention is not limited to the shape of the upper rim 19 of cooking vessel 14.

It is necessary that cooking vessel 14 be made of a material that is water-tight and either heat conductive or heat retentive. Coking vessel 14 is preferably of a metal and most preferably of spun aluminum chosen for its low weight, low cost, and heat-transmissive properties. Other suitable materials given by way of illustration and not by limitation include pressed or stamped stainless steel, rolled carbon steel, or copper. The invention is also adaptable to ceramic cooking vessels.

Cooking vessel 14 includes handles 20 which are typically attached by welds or rivets to the exterior surface 22 of cooking vessel 14. The presence of handles 20 allow for manual stabilizing of cooking vessel 14 while in the cooking process and also facilitates the transportation of cooking vessel 14. Handles 20 are most preferably of a non-heat conducting material such as wood or heat-resistant plastic to allow for manipulation while in operation; handles 20 can be metal for ease of construction and durability. A lid 24 is provided for cooking vessel 14.

Lid 24 for a wok-type cooking vessel is preferably of a hemispherical shape with a vertical terminus 25, and is most typically of spun aluminum. At the apex of lid 24 is a lid grip 26. Lid grip 26 is most preferably a wooden knob or handle attached to lid 24 by a fastener 28 driven up through lid 24 to engage lid grip 26. Lid 24 has a weight which tends to pressurize the interior of cooking vessel 14.

Figure 3:
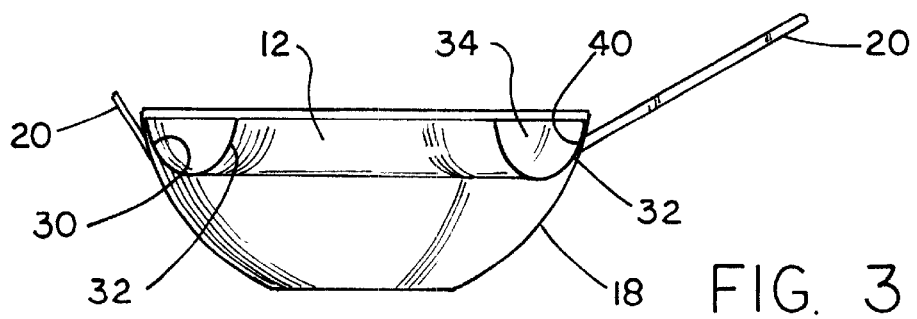
FIG. 3 is a vertical cross-section of the insert and cooking vessel of FIG. 2 taken along the line 3—3.
Figure 6:
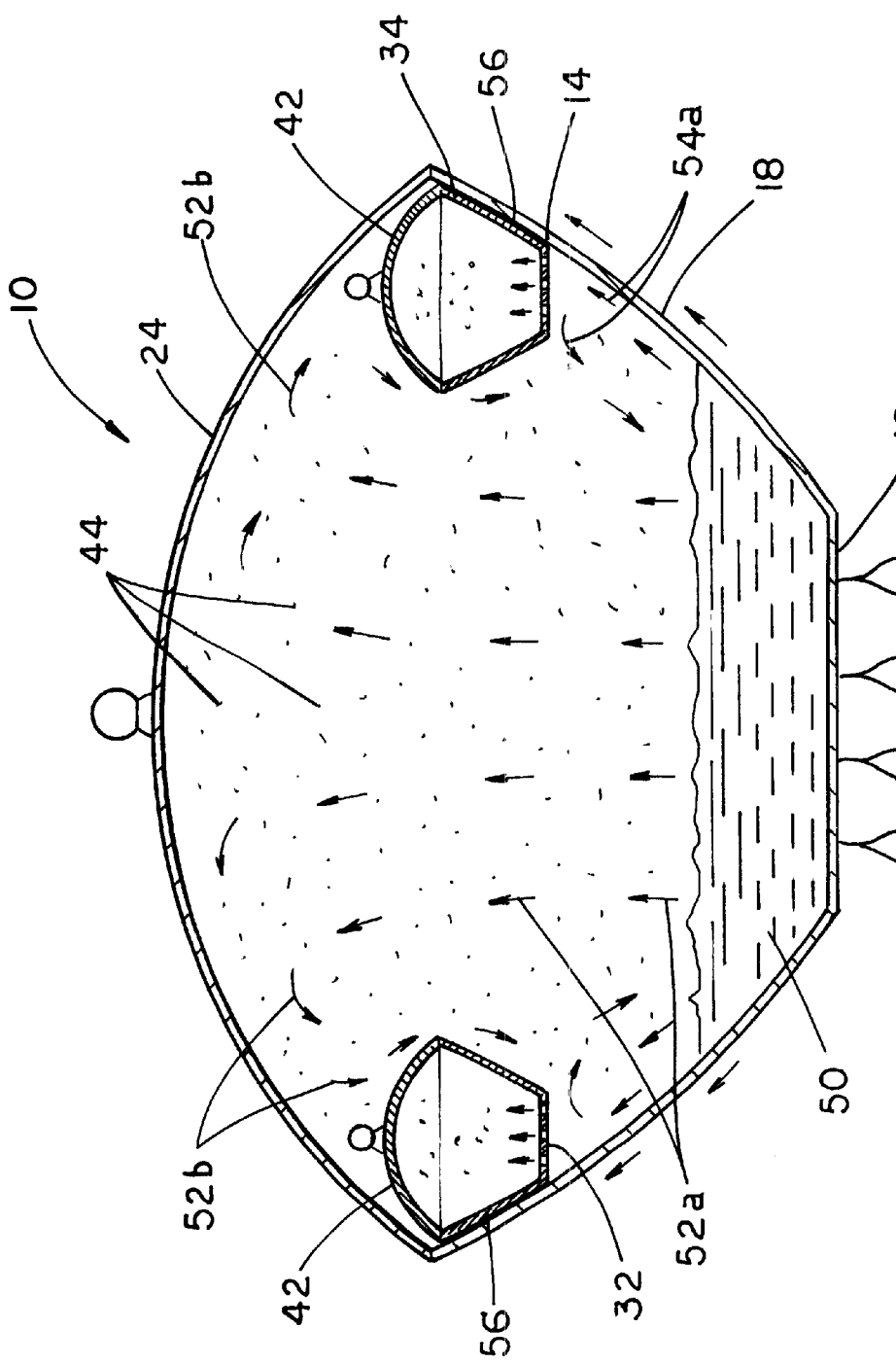
FIG. 6 is a cross-sectional view of yet another embodiment of the invention showing a flat-bottom insert member.

As can be seen in FIGS. 2 and 3, insert 12 has a concave upper surface 30 to create a trough 34 and convex lower surface 32. As shown in FIG. 3, trough 34 has uniform curvature. While aesthetically pleasing, it should be realized that regular curvature is not necessary for the proper functioning of the invention. The cross-section may be of any geometric shape including, for example only, a flat bottom as depicted in FIG. 6.

It is preferable that trough 34 be made of a heat-conducting and heat-retaining material. For reasons stated above, spun aluminum is a preferred material for the construction of insert 12. Trough 34 has a series of apertures 36 spaced evenly throughout. These apertures 36 provide two functions: to allow for steam 44 to penetrate trough 34 from underneath and to allow for any fluid found in trough 34 due to juicing of food items 38 or condensation of steam 44, to flow back down into bottom 16 of cooking vessel 14. Trough 34 is of sufficient depth to receive food items 38 within. By food items 38, applicant is not only referring to consumable items such as vegetables and meat, but aromatic spices and seasonings such as garlic or onions which may not be cooked for intention of direct consumption but rather placed in trough 34 to season other food items 38 placed in bottom 16 of cooking vessel 14.

Trough 34 is most advantageously approximately three inches in depth and four inches in width at the uppermost edges thereof. As shown in FIGS. 2 and 3, insert 12 is an annular ring running the full 360° circumjacent to the inner edge 40 of cooking vessel 14 remote from bottom 16.

A portion of lower surface 32 of trough 34 snugly engages inner edge 40 of sidewall 18 of cooking vessel 14 and thus is supported by sidewalls 18 of cooking vessel 14 in its location remote to bottom 16 of cooking vessel 14. As seen in FIGS. 2 and 5, trough 34 runs 360° around edge 40 of cooking vessel 14, which in this embodiment is a round cooking vessel. It should be noted, however, that the proper function of the device is not dependent on the range through which trough 34 extends around the circumference of cooking vessel 14. In order to be supported by sidewalls 18 of cooking vessel 14 without slippage, trough 34 must cover at least 180° of the circumference of a circular cooking vessel 14.

Figure 4:
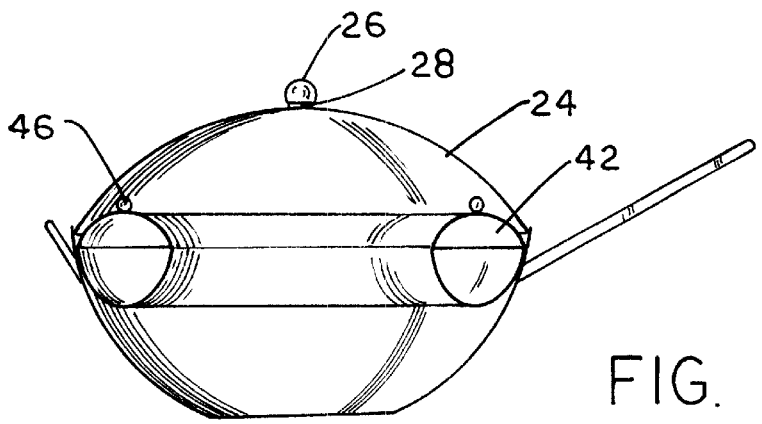
FIG. 4 is a cross-section of the invention additionally containing the cooking vessel lid and the insert cover.
Figure 5:
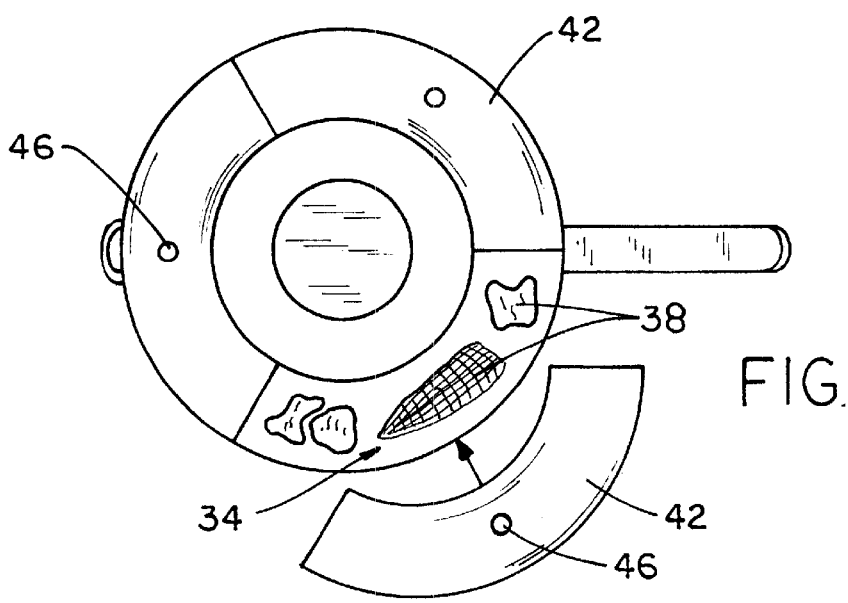
FIG. 5 is a top view of the cooking system showing an annular insert with a segmented insert cover and showing one of the segmented insert covers removed.
Figure 7:
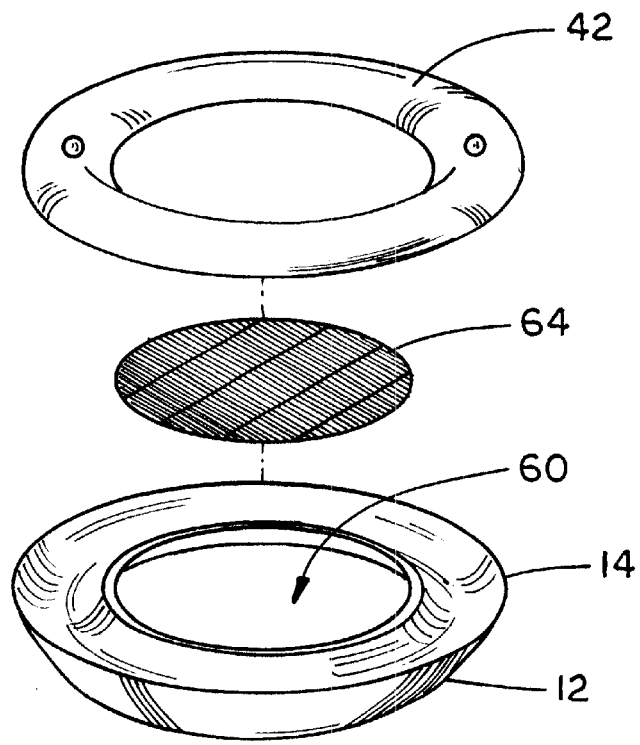
FIG. 7 is an exploded perspective view of an embodiment of this invention.

Turning to FIGS. 4 and 7, cooking system 10 is most advantageously presented when trough 34 has a insert cover 42 extending around trough 34. Insert cover 42 is of a similar material as trough 34. Insert cover 42 accomplishes either of two purposes: to retain heat within trough 34; and to protect food items 38 within trough 34 from contact with steam 44 generated within cooking system 10 when utilized with lid 24.

Turning to FIGS. 4 and 5, insert cover 42 is made more advantageous by the inclusion of heat-insulating trough handles 46 strategically placed on insert cover 42 to allow for easy removal of insert cover 42 from insert 12. Insert cover 42 is made even more advantageous by segmenting it. As depicted in FIG. 5, the annular ring insert cover 42 has been divided into three segments. In this way, during the cooking process, one segment of insert cover 42 may be removed to allow for inspection of food items 38 within trough 34 without releasing heat from the entire trough 34 and without subjecting all food items 38 within trough 34 to steam 44. Being segmented, insert cover 42 will be easier to handle by the cook as well.

Insert cover 42, to accomplish either of its dual purposes, need not have the same depth as trough 34. It has been shown that for a trough 34 of a three-inch depth, a cover of one and one-half inches depth is sufficient for most purposes. Insert cover 42 most typically does not bear apertures.

As seen is FIG. 7, heat from a heat source 48 is applied to bottom 16 of cooking vessel 14. The heat is conducted to the liquid 50 in bottom 16 of the cooking vessel 14. As the heated liquid 50 becomes steam 44, it rises as shown by arrows 52a. As steam 44 reaches the upper portions of cooking system 10, it encounters the apex of lid 24 and is deflected downward along lid 24 toward insert cover 42 shown by arrows 52b. Steam 44 then flows around the exterior of insert cover 42 and trough 34 having transferred some of its radiant heat to trough 34 and insert cover 42. The slightly cooled steam 44 then descends back toward liquid 50 where it is re-energized and returns to steam path 52a. At the same time, liquid 52 heated at the periphery of cooled liquid 50 is heated and rises to encounter lower surface 32 of trough 34 thereby transferring some of the heat of steam 44 to said lower surface 32. As shown by arrows 54a said cooled steam 44 is re-energized and takes a convective path.

At the same time that heat is being conducted to liquid 50 from heat source 48, some of the heat is conducted along sidewalls 18 of metallic pan 14 to encounter lower surface 32 of trough 34 at an interface 56 between lower surface 32 of trough 34 and sidewalls 18 of cooking vessel 14. In this way, food items 38 contained within trough 34 receive heat from all directions thereby preventing hot spots and promoting efficient cooking.

Also demonstrated in FIGS. 5 and 9 is the attribute of a central opening 60 through which utensils 62 may extend to reach bottom 16 of cooking vessel 14. In this way, food items 38 may be stir-fried or sauteed in bottom 16 of cooking vessel 14 while coincidentally other food items 38 may be warmed in trough 34. Further, fluid or ingredients may be added to bottom 16 of cooking vessel 12 without disrupting the contents of trough 34.

Figure 8:
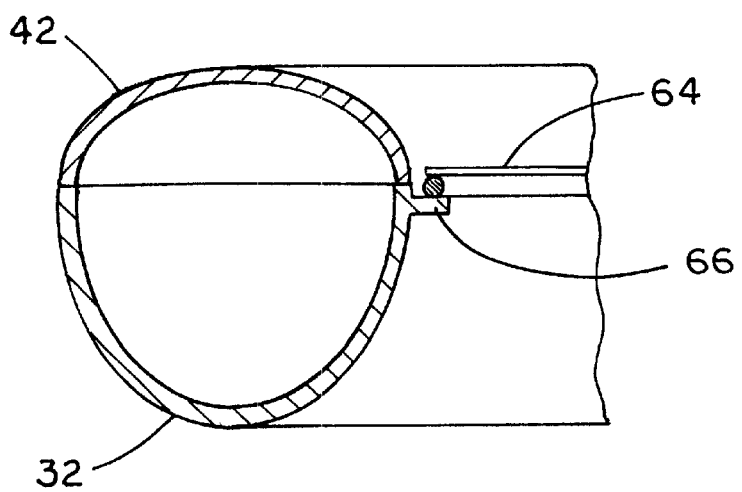
FIG. 8 is a partial cross-sectional view of the insert and insert cover, with screen-support members.

When bottom 16 of cooking vessel 14 contains liquid 50 for steam generation as shown in FIG. 6, a horizontal screen 64 (FIGS. 7, 8) may be advantageously placed over a portion of central opening 60. Preferably, screen 64 is removably supported by a screen-support member 66 extending radially inwardly from lower surface 32 of trough 34, thereby holding screen 64 in a stable, horizontal position. Screen 64 is composed of a metal mesh or grid which allows ascendent steam 44, as seen in FIG. 6, to encounter food items 38 placed on screen 64. In this manner, different food items 38 may be steamed on screen 64 and in trough 34 at the same time without their juices being in contact.

Figure 10:
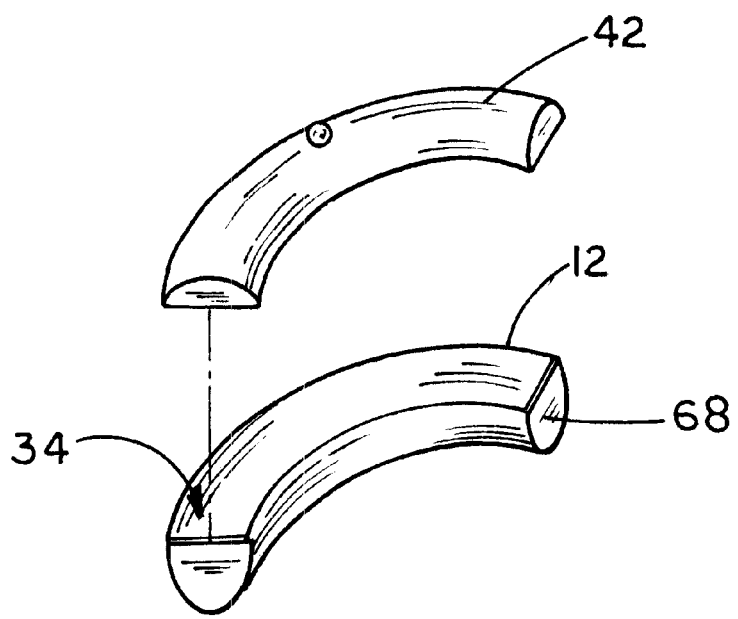
FIG. 10 is a perspective view of the truncated insert device of FIG. 9.

FIGS. 9 and 10 illustrate another embodiment of cooking system 10 wherein insert 12 is a truncated annulus. As described above, within a circular cooking vessel 14 as depicted, annular insert 12 has an arcuate range of at least 180° and is thus able to be supported by sidewalls 18 within cooking vessel 14. End walls 68 are provided to substantially enclose at least the lower portion of the truncated ends of trough 34 to prevent food items 38 from rolling or falling out of trough 34. As shown, segmented insert covers 42 are provided of a complementary shape to cover trough 34. With a truncated annular insert 12, it is easier for a cook manipulating food 38 within cooking vessel 14 with a utensil 62. As shown, while food items 38 are being cooked in bottom 16 of cooking vessel 14, segmented insert cover 42 may be removed and food items 38 within trough 34 may be checked.

Figure 12:
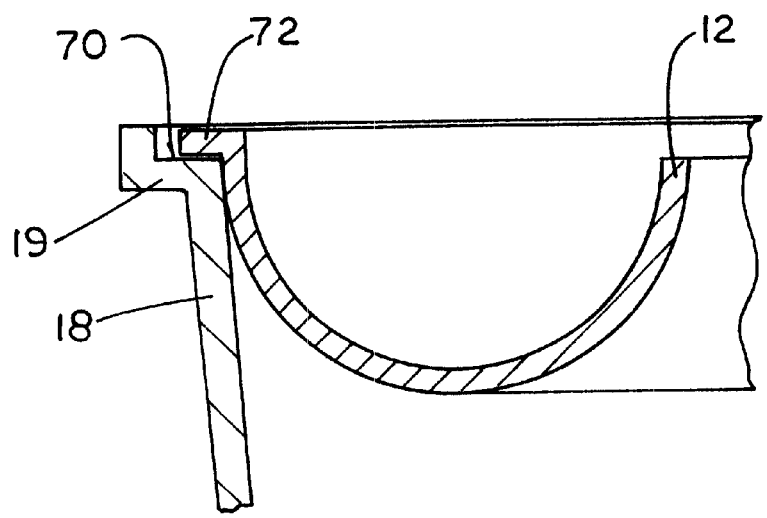
FIG. 12 is an enlarged cutout of the cross-sectional view of FIG. 11 taken along the cut-line 12.
Figure 13:
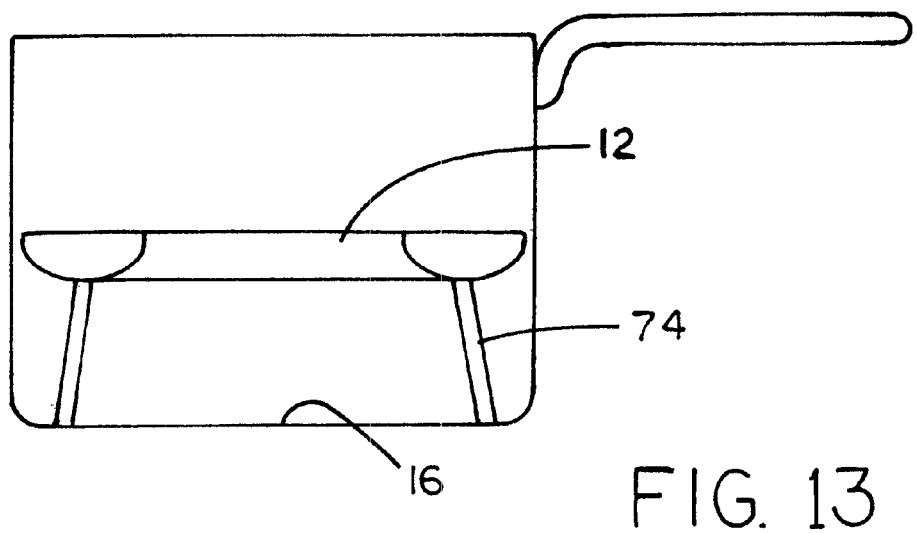
FIG. 13 is a cross-sectional view of an alternate embodiment of the invention with insert-support members in a substantially cylindrical cooking vessel.
Figure 14:
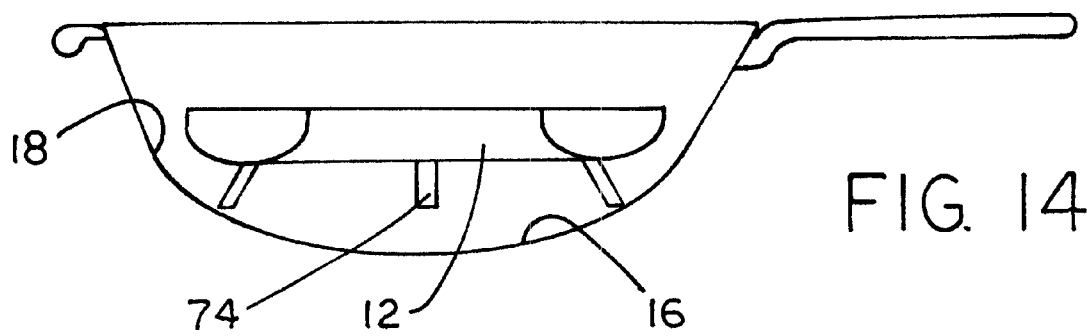
FIG. 14 is a cross-sectional view of an alternate embodiment of the invention with insert-support members in a substantially bowl-shaped cooking vessel.

Insert 12 is most preferably supported by side wall 18 of cooking vessel 14 through engagement at interface 56 with lower surface 32 of trough 34. In the alternative, another embodiment as shown in FIG. 11 is provided. In this embodiment, a cylindrical or square cooking vessel 14 with near vertical side walls 18 is depicted. As best seen in FIG. 12, sidewall 18 terminates at an upper rim 19 having a radially outwardly extending ledge 70. Insert 12 includes a radially outwardly extending brim 72. Ledge 70 removably and supportingly receives brim 72 of insert 12. Alternatively, support members 74 (FIGS. 13, 14) may be provided to extend between insert 12 and the interior of cooking vessel 14. Support members 74 may be of any configuration (including for example, inclined, vertical or horizontal) which allow insert 12 to be supported within cooking vessel 14 remote from bottom 16 thereof. Support members 74 may be integral with either insert 12 or cooking vessel 14, or may be removable with respect to both. Alternative configurations of support members 74 allow for retrofitting existing cooking vessels 14 and further create new convection patterns.

While the principles of the invention have been shown and described in connection with but a few embodiments, it is to be understood clearly that such embodiments are by way of example and are not limiting.

I claim:

1. An improved cooking system of the type having a cooking vessel with a watertight lower portion of a concave interior, having side walls generally upwardly extending from a bottom, the improvement comprising an annular, substantially hemi-toroidal insert, dimensioned to engage an inner surface of the side walls thereby removably supporting the insert within the cooking vessel remote from the bottom, thereby providing a central opening above the bottom of the vessel whereby the bottom of the vessel may be accessed.

2. The improved cooking system of claim 1 wherein the insert has a body defining a plurality of apertures.

3. The improved cooking system of claim 2 further comprising an annular, substantially hemi-toroidal, insert cover.

4. The improved cooking system of claim 3 wherein the insert cover is segmented.

5. The improved cooking system of claim 3 wherein the cooking-vessel sidewalls upwardly terminate in a circular vessel-rim having an inside diameter, the improved cooking system further comprising a hollow dome-like vessel lid having inner and outer surfaces terminating in a circular vessel-lid rim having an outside diameter at the extremity thereof, the vessel lid removably supported by the cooking-vessel sidewalls.

6. The improved cooking system of claim 5 wherein the outside diameter of the lid is less than the inside diameter of the vessel rim whereby the dome-like vessel lid is removably supported by the cooking-vessel sidewalls in a position entirely enclosing the insert.

7. The improved cooking system of claim 5 wherein the lid is releasably sealed to the sidewalls.

8. The improved cooking system of claim 1 wherein the insert is a truncated annulus having an arcuate range at least 180° about a main axis of the annular, substantially hemi-toroidal insert.

9. The improved cooking system of claim 8 further comprising insert end walls at truncated annular ends of the insert.

10. The improved cooking system of claim 9 further comprising a truncated annular, substantially hemi-toroidal insert cover.

11. The improved cooking system of claim 10 wherein the truncated insert cover is segmented.

12. The improved cooking system of claim 1 wherein the cooking vessel has bowl-like side walls having a plurality of horizontal, circular cross-sections each with a common side-wall axis further comprising a main insert axis coaxial with the side-wall axis.

13. The improved cooking system of claim 1 wherein the central opening is at least partially enclosed by a central inlay attached with respect to the insert.

14. The improved cooking system of claim 13 wherein the inlay is a horizontal, mesh cooking surface.

15. The improved cooking system of claim 13 wherein the inlay is an upwardly opening, downwardly extending, concave mesh basket.

16. A cooking-device insert for vertical insertion into a cooking device said cooking device having a bottom and having side walls extending upwardly from the bottom, said side walls with an upper portion having an interior surface of a specific shape, comprising:

an annular trough member extending circumjacent along the inner surface of the side walls, having an upwardly-opening, concave upper surface and a convex under surface;

at least one support member attached with respect to the cooking device and attached with respect to the trough member whereby the trough member may be removably supported within the cooking device.

17. The cooking-device insert of claim 16 wherein the at least one support member is at least one inwardly extending projection integrally attached to the interior surface of the side wall and extending out therefrom to engage the insert.

18. The cooking-device insert of claim 16 wherein the at least one support member is at least one generally-downwardly extending projection integrally attached to the convex under surface of the trough.

19. The cooking-device insert of claim 16 wherein the at least one support member is at least one generally-downwardly extending projection removably attached to the convex under surface of the trough.

* * * * *